(12) United States Patent
Morgan

(10) Patent No.: US 9,376,169 B1
(45) Date of Patent: Jun. 28, 2016

(54) RATLINE FOR MODERN SAILBOATS AND METHOD FOR PROVIDING A REMOVABLY-POSITIONABLE RATLINE

(71) Applicant: TIWA, LLC, Albuquerque, NM (US)

(72) Inventor: Jef Morgan, Albuquerque, NM (US)

(73) Assignee: TIWA, LLC, Albuquerque ( * ) Notice: Subject to any disclaimer, the term of this patent is extended or adjusted under 35 U.S.C. 154(b) by 149 days.

(21) Appl. No.: 14/199,825

(22) Filed: Mar. 6, 2014

Related U.S. Application Data

(60) Provisional application No. 61/799,350, filed on Mar. 15, 2013.

(51) Int. Cl.
| | | |
|---|---|---|
| *F16G 11/00* | (2006.01) | |
| *B63B 15/02* | (2006.01) | |
| *F16B 2/08* | (2006.01) | |
| *E06C 7/08* | (2006.01) | |

(52) U.S. Cl.
CPC ............ *B63B 15/02* (2013.01); *E06C 7/083* (2013.01); *F16B 2/08* (2013.01)

(58) Field of Classification Search
CPC .............. E06C 9/14; E06C 1/56; E06C 7/83; B63B 29/20; B63B 29/205; B63B 15/02; Y10T 24/44504; Y10T 24/44598; Y10T 24/44974; F16B 2/08
USPC ............... 114/213, 102.1; 182/196, 197, 198, 182/228.1, 228.3, 228.4
See application file for complete search history.

(56) References Cited

U.S. PATENT DOCUMENTS

| | | | |
|---|---|---|---|
| 120,820 A | | 11/1871 | Knowlton |
| 414,631 A | * | 11/1889 | Coleman ................. B63H 9/10 114/101 |
| 2,079,034 A | | 5/1937 | Parkin |
| 3,008,537 A | | 11/1961 | Roberts et al. |
| 3,422,925 A | | 1/1969 | Petrie |
| 4,343,056 A | | 8/1982 | McDonald |
| 4,577,726 A | | 3/1986 | Wheeler |
| 5,178,090 A | * | 1/1993 | Carter ..................... B63C 11/46 114/245 |
| 6,955,631 B2 | | 10/2005 | Wu |
| 6,990,928 B2 | | 1/2006 | Kurtgis |
| 7,585,197 B1 | * | 9/2009 | Merten ..................... B63C 9/26 182/136 |
| D659,073 S | | 5/2012 | Burns |
| 8,360,202 B1 | | 1/2013 | Woodard |

FOREIGN PATENT DOCUMENTS

FR 2 559 735 8/1985

OTHER PUBLICATIONS

Almberg, "Getting Up in the World", The Unlikely Boat Builder http://www.unlikelyboatbuilder.com/2012/01/getting-up-in-world.html, Jan. 14, 2012.

* cited by examiner

*Primary Examiner* — Andrew Polay
(74) *Attorney, Agent, or Firm* — Isaac Estrada; Philip D. Askenazy; Peacock Myers, P.C.

(57) ABSTRACT

A removably-positionable ratline for modern sailboats comprising an adjustable belt and two shroud vice clamps with a base member and a jaw comprising mating faces with arcs that, when aligned with one another, allow a fastener to be engaged through them so as to hold both components together and form a central opening to grip a shroud cable.

4 Claims, 6 Drawing Sheets

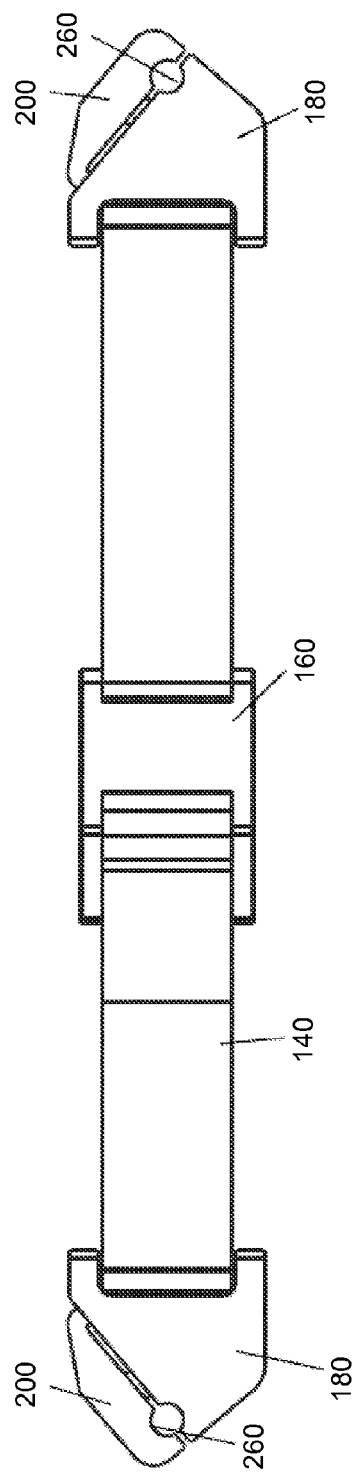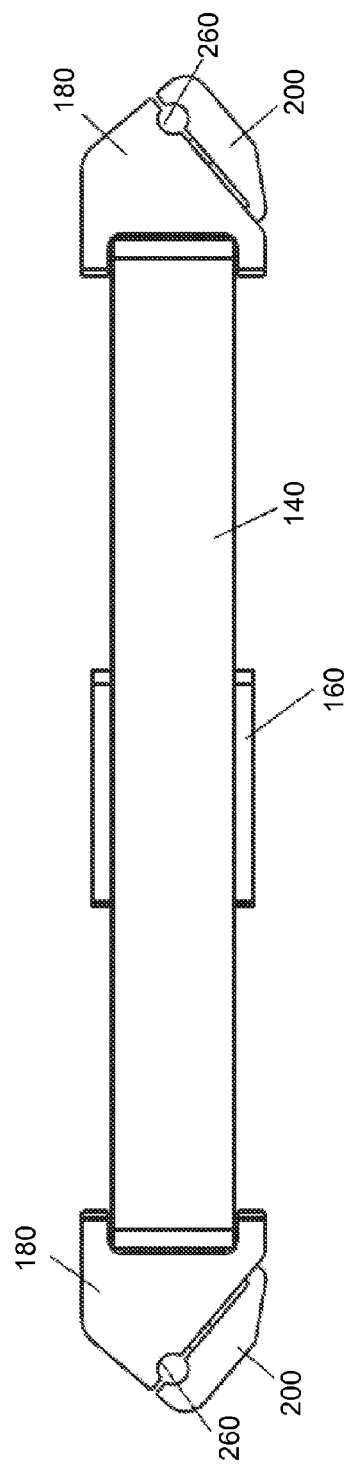

RATLINE FOR MODERN SAILBOATS AND METHOD FOR PROVIDING A REMOVABLY-POSITIONABLE RATLINE

CROSS-REFERENCE TO RELATED APPLICATIONS

This application claims priority to and the benefit of the filing of U.S. Provisional Patent Application Ser. No. 61/799,350, entitled "RATLINE FOR SAILBOATS", filed on Mar. 15, 2013, and the specification thereof is incorporated herein by reference.

BACKGROUND OF THE INVENTION

1. Field of the Invention (Technical Field)

Embodiments of the present invention relate to temporary steps, and more particularly, to adjustable, temporary steps comprising vice clamps.

2. Description of Related Art

Although ratlines were ubiquitous in sail ships for centuries, e.g. Spanish Galleons in the 1500's, modern, smaller sailboats have steel cable rigging supporting the mast through connections with the hull without any ratlines whatsoever. Nevertheless, ratlines in these modern sailboats would be very useful during sailing to improve, for example, visibility while navigating around reefs or entering unfamiliar harbors. However, permanent ratlines would have the disadvantage of being in the way or increasing wind resistance during long voyages. Thus, there is a need for removable ratlines capable of attaching to the fixed steel cable rigging in modern sailboats.

Embodiments of the present invention solve this problem by providing practical, removable, temporary ratlines that can easily and effectively clamp onto the steel cables of the standing rigging in modern sailboats.

BRIEF SUMMARY OF THE INVENTION

Embodiments of the present invention comprise a removably-positionable ratline that is disposed between two shroud cables of the lower mast rigging in a sailboat comprising a belt and vice clamps. Preferably, at least one vice clamp comprises a base member comprising a first mating face, a removably-positionable jaw comprising a second mating face, the first mating face comprising a first arc, the first arc having a primary axis which is perpendicular to a primary axis of said base member, the second mating face comprising a second arc, the second arc having a primary axis which perpendicularly traverses a primary axis of the second mating face, a first fastener opening passing through the first mating face, a second fastener opening in the removably-positionable jaw, the second fastener opening passing completely through at least a portion of said removably-positionable jaw, the first and second fastener openings positioned such that when at least substantially aligned with one another, a fastener can be utilized therein so as to hold the first and second mating faces together and such that the first and second arcs form a central opening which passes through the first and second mating faces.

In one embodiment, the base and removably-positionable jaw are made of aluminum alloy. In one embodiment, the fastener is made of stainless steel. In a different embodiment, there are two or more fasteners. In a different embodiment, the removably-positionable jaw comprises a pivot point at an end opposite the arcs.

In one embodiment, the belt is an adjustable length belt. In one embodiment the belt is adjusted with a buckle.

Embodiments of the present invention comprise a method for providing a removably-positionable ratline between two shroud cables of a lower mast rigging in a sailboat comprising clamping two vice clamps onto the shroud cables, disposing an adjustable belt between the two vice clamps, and adjusting the belt to a desired tightness.

In one embodiment, the clamping of the two shroud vice clamps onto the shroud cables comprises loosening fasteners of the vice clamps so that their removably-positionable jaws separate from their clamp bases, positioning the shroud vice clamps next to the shroud cables and fitting the shroud cables in between arcs of the vice clamps, and fastening the fasteners until they are tight.

In another embodiment, the method comprises disposing more than one removably-positionable ratline between two shroud cables to form a ladder.

Further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings:

FIG. 6 is a top view of the ratline of FIG. 5;

FIG. 7 is a bottom view of the ratline of FIG. 5; and

DETAILED DESCRIPTION OF THE INVENTION

Figure 1:
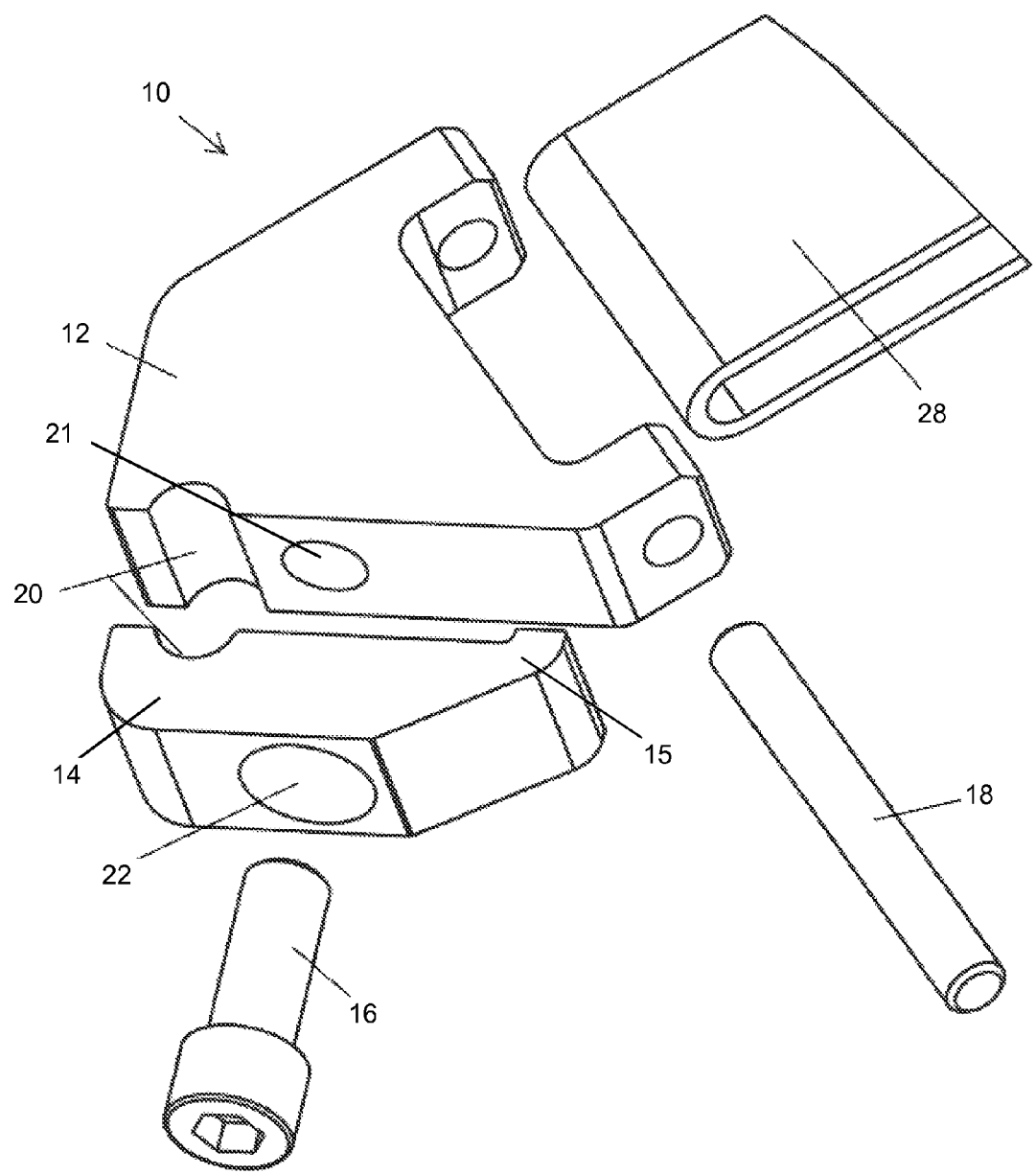
FIG. 1 is perspective top view of an embodiment of the present invention.

Referring to the Figures and more particularly to FIG. 1, in one embodiment of the invention, vice clamp 10 preferably comprises clamp base member 12, removably-positionable jaw 14, fastener 16, and pin 18. In one embodiment, pin 18 need not be round and can be formed into clamp base member 12, such that it is formed as a single continuous piece of base member 12. In a preferred embodiment, clamp base member 12 and removably-positionable jaw 14 each comprise a mating face with arcs 20 through which a cable, e.g., a shroud, is placed. Preferably, the arc in the mating face of base member 12 has a primary axis which is perpendicular to the primary axis of base member 12. Preferably, the primary axis of base 12 is parallel with pin 18. Preferably, the arc 20 of removably-positionable jaw 14 has a primary axis that perpendicularly traverses the primary axis of the mating face of removably-positionable jaw 14.

The size of arcs 20 varies, for example, depending on the diameter of a sail boat rigging's cable on which the vice clamp is installed. Preferably, clamp base 12 and removably-positionable jaw 14 are made of a resistant, light and hard, suitable material, such as, but not limited to, an aluminum alloy, combinations thereof, and the like. Similarly, fastener 16, and pin 18 can be made of a resistant and hard, suitable material, such as, but not limited to, stainless steel, combinations thereof, and the like. In one embodiment, pin 18 is preferably a cylindrical rod, but other suitable shapes may be applied, such as, but not limited to elongated triangular, square, rectangular, and other elongated and/or extruded shapes, combinations thereof, and the like. In one embodiment, removably-positionable jaw 14 comprises pivot point 15 to increase the grip power of the clamp. Pivot point 15 creates a separation between clamp base 12 and removably-positionable jaw 14 in the closed configuration wherein the fastener 16 force pivots, directing the clamping force onto, for example, cable shrouds. An increase in distance between pivot point 15 and the fastener 16 over the distance between a cable shroud and the fastener 16, acts as a lever arm to increase the fastener 16 force exerted into the shroud.

Figure 2:
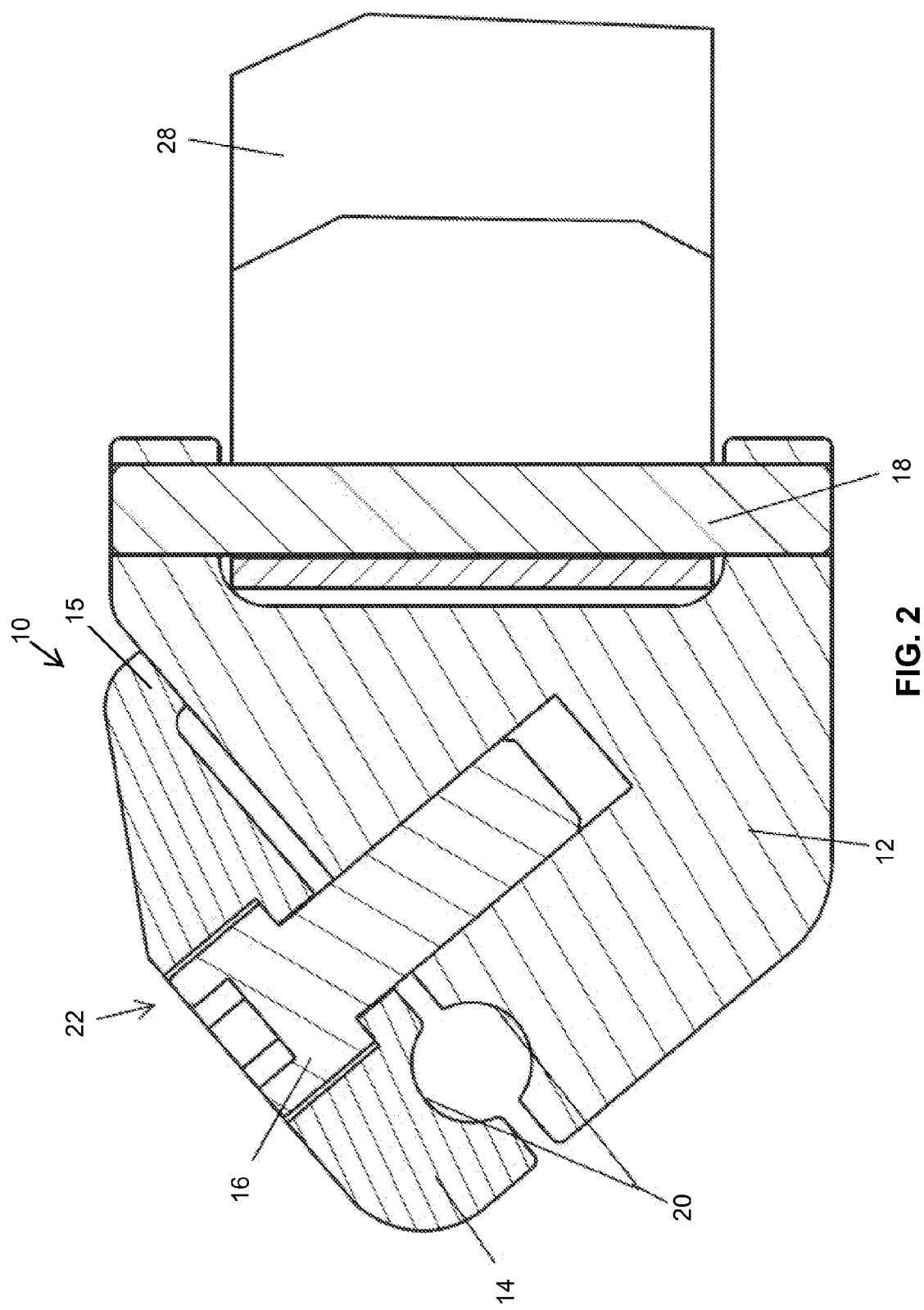
FIG. 2 is a cross-sectional view of the embodiment of FIG. 1 in the closed configuration.
Figure 3:
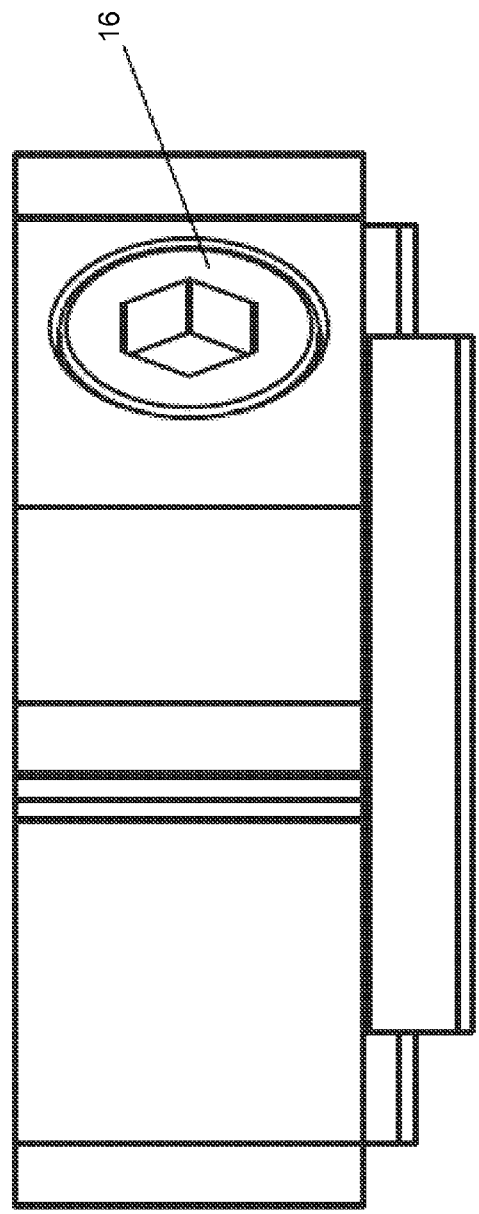
FIG. 3 is a front view of the embodiment of FIG. 1.
Figure 4:
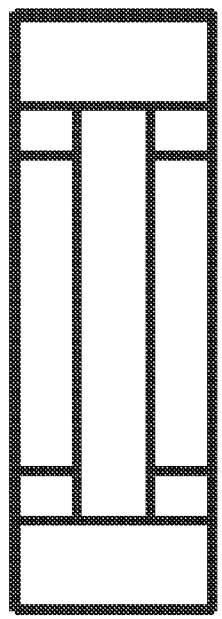
FIG. 4 is a back view of the embodiment of FIG. 1.
Figure 5:
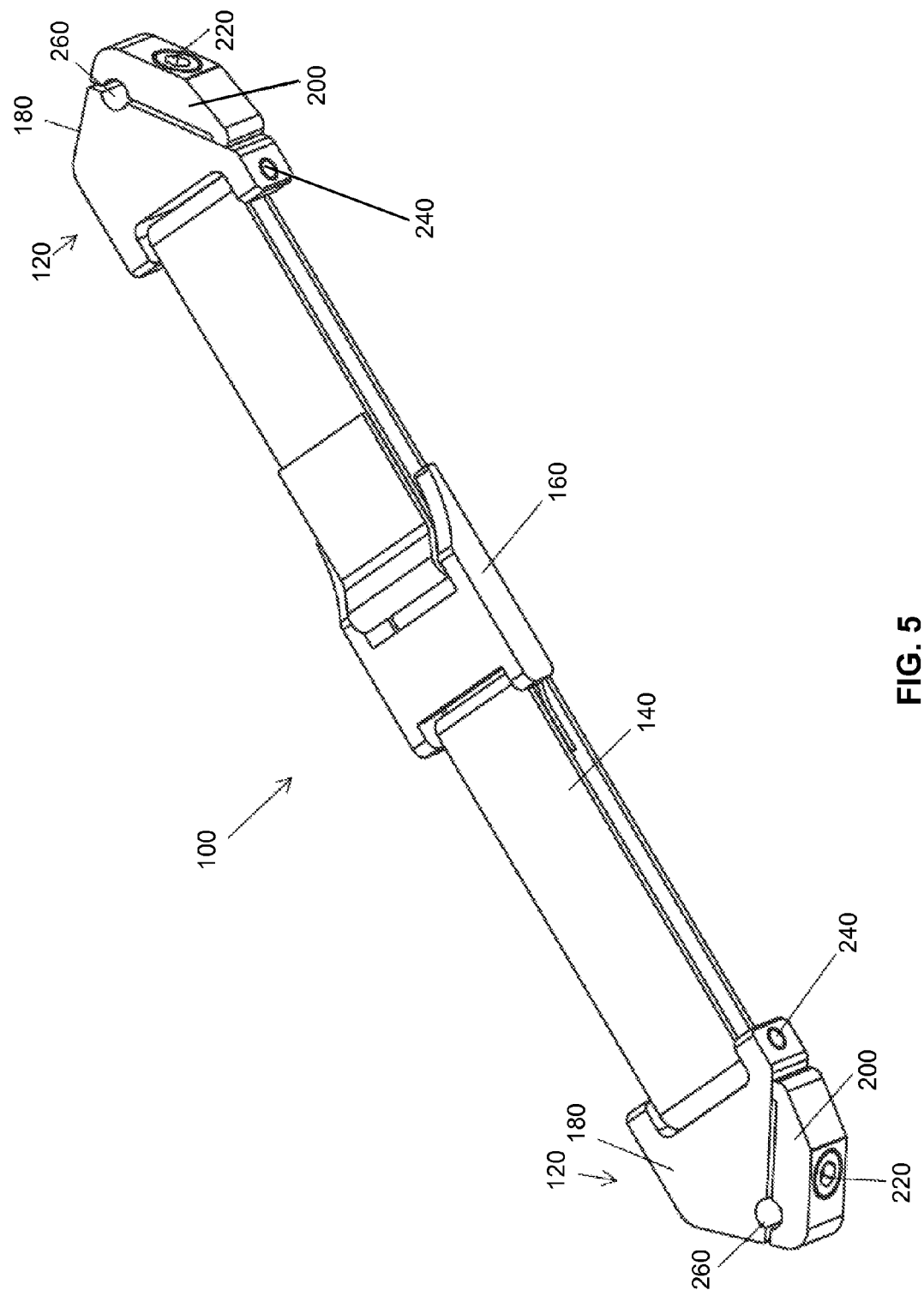
FIG. 5 shows a ratline comprising the embodiment of FIG. 1.
Figure 8:
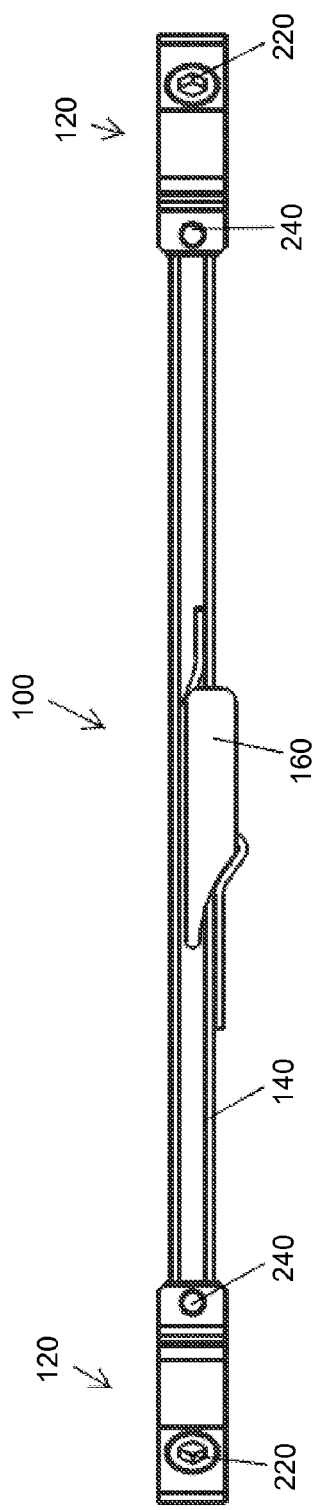
FIGS. 8 and 9 are right (upside-down) and left side views of the ratline of FIG. 5.
Figure 9:
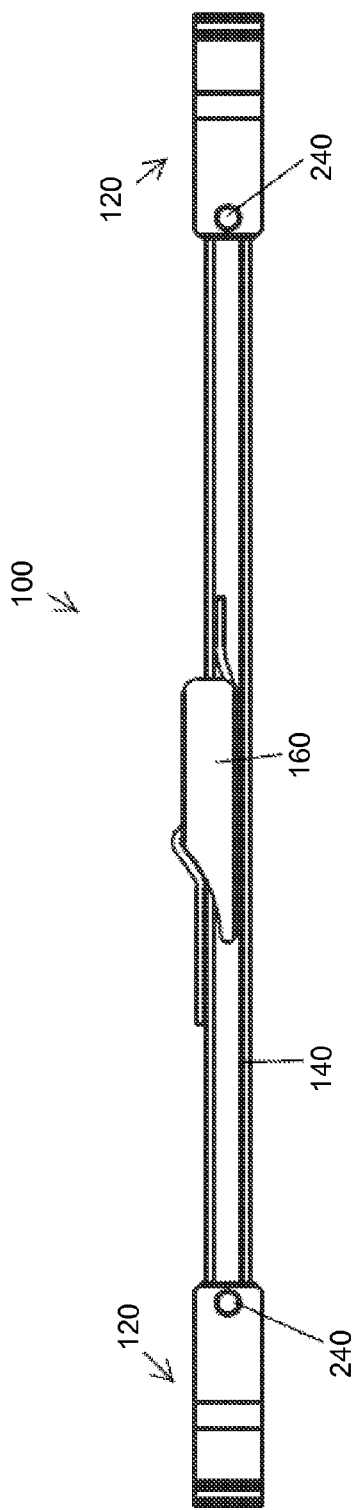

Referring now to FIG. 2, in a preferred embodiment, hole 22 in clamp 10 allows fastener 16 to pass through removably-positionable jaw 14 and attach it to clamp base 12. Preferably, hole 22 is a conterbore hole to allow fastener 16 to be flush with the exterior surface of removably-positionable jaw 14 after being tightened during the installation of the clamp. Alternatively, a regular hole can be drilled into the removably-positionable jaw 14 and fastener 16 can protrude after fastened.

In one embodiment of the present invention, ratline 100 comprises vice clamps 120 at a first and a second end of ratline 100. Preferably, vice clamps 120 comprise bases 180, removably-positionable jaws 200, fasteners 220, and pins 240. Optionally, pins 240 are absent and equivalent structures are formed into bases 180 as a single continuous piece of material. Preferably ratline 100 comprises belt 140. Optionally, belt 140 is adjustable so that ratline 100 is capable of accommodating diverse shroud spacing, since lower shrouds, which are commonly part of a ship's standing rigging, are typically separated at the sailboat's hull and gradually get closer together as they attach to the sailboat's mast. Preferably, belt 140 comprises a length adjusting mechanism, such as, but not limited to, buckle 160.

In one embodiment of the present invention, ratline 100 is clamped onto cables of the lower mast rigging in a modern sailboat by loosening fasteners 220 enough for removably-positionable jaws 200 to separate from clamp bases 180 to fit the rigging cable between them, positioning one of ratline vice clamp 120 next to the cable and fitting the cable in between arcs 260, then fastening fastener 220 until it is tight. This process is repeated for the other vice clamp 120. Buckle 160 is then used to adjust/tighten ratline 100 to the desired tightness. Multiple ratlines may be attached in parallel to allow a sailor to climb on them.

INDUSTRIAL APPLICABILITY

The invention is further illustrated by the following non-limiting examples.

Example 1

Two vice clamps were machined in accordance with the specification of the present application. The base and jaw components were manufactured of aluminum allow and the pin and fastener were manufactured of stainless steel. The base and jaw comprised arcs to accommodate a standard size steel cable of the lower mast rigging of a modern sailboat.

The two vice clamps were used to assemble a removable ratline comprising a nylon belt and a buckle for adjusting the length of the ratline. When a plurality of ratlines were affixed on the cables of the lower mast rigging in a modern sailboat by loosening and tightening their vice clamps, the ratlines provided sturdy, removable steps to climb up the rigging.

In one embodiment, the present invention does not include any type of clip, clamp, or other grasping member not intended to be used on shroud of a sailboat.

The preceding example can be repeated with similar success by substituting the generically or specifically described reactants and/or operating conditions of this invention for those used in the preceding examples.

Note that in the specification and claims, "about" or "approximately" means within twenty percent (20%) of the numerical amount cited.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A removably-positionable ratline for sailboats comprising:

a length adjustable belt comprising two ends;
a buckle to adjust the length of said belt;
two shroud vice clamps disposed at the ends of said belt;
at least one of said shroud vice clamps comprising:
a base member comprising a first mating face; and
a removably-positionable jaw comprising a second mating face;
said first mating face comprising a first arc;
said first arc having a primary axis which is perpendicular to a primary axis of said base member;
said second mating face comprising a second arc;
said second arc having a primary axis which is perpendicular to a primary axis of said second mating face;
a first fastener opening passing through said first mating face;
a second fastener opening in said removably-positionable jaw;
said second fastener opening passing completely through at least a portion of said removably-positionable jaw;
said first and second fastener openings positioned such that when at least substantially aligned with one another, a fastener can be engaged therein so as to hold said first and second mating faces together and such that said first and second arcs form a central opening which passes through said first and second mating faces; and
said removably-positionable jaw comprising a pivot point at an end opposite said arcs.

2. The removably-positionable ratline of claim 1 wherein said base and removably-positionable jaw are made of aluminum alloy.

3. The removably-positionable ratline of claim 1 wherein said fastener is made of stainless steel.

4. The removably-positionable ratline of claim 1 wherein said at least one of said shroud vice clamps comprises two or more fasteners.

* * * * *